US008963086B2

(12) United States Patent
Gelonese et al.

(10) Patent No.: US 8,963,086 B2
(45) Date of Patent: Feb. 24, 2015

(54) SHIELDING OF AN IR DETECTOR

(75) Inventors: Guiseppe Antonio Gelonese, Dulwich (AU); Riccardo Angelo Leo Gatto, Dulwich (AU)

(73) Assignee: Embertec Pty Ltd (AU)

( * ) Notice: Subject to any disclaimer, the term of this patent is extended or adjusted under 35 U.S.C. 154(b) by 344 days.

(21) Appl. No.: 13/490,567

(22) Filed: Jun. 7, 2012

(65) Prior Publication Data

US 2012/0312989 A1  Dec. 13, 2012

(30) Foreign Application Priority Data

Jun. 8, 2011  (AU) ................. 2011902260

(51) Int. Cl.
*G01J 5/06* (2006.01)
*G01J 5/00* (2006.01)
*G01J 5/02* (2006.01)
*G01J 5/08* (2006.01)

(52) U.S. Cl.
CPC .............. *G01J 5/0025* (2013.01); *G01J 5/025* (2013.01); *G01J 5/06* (2013.01); *G01J 5/0806* (2013.01); *G01J 2005/065* (2013.01)
USPC ....................................... 250/338.1

(58) Field of Classification Search
CPC ........ G01D 1/00; G01J 1/06; G01J 2005/065; G01J 5/0025; G01J 5/025; G01J 5/06; G01J 5/0806; G02B 13/14
USPC ............................................ 250/338.1, 515.1
See application file for complete search history.

(56) References Cited

U.S. PATENT DOCUMENTS

2006/0257154 A1* 11/2006 Yu .................................. 398/212
2009/0195704 A1*  8/2009 Bombara ....................... 348/734

* cited by examiner

*Primary Examiner* — Mark R Gaworecki
(74) *Attorney, Agent, or Firm* — Craig A. Fieschko, Esq.; DeWitt Ross & Stevens S.C.

(57) ABSTRACT

In an electrical device controlled by infrared signals from a remote control, a power saving device has an infrared detection module and a processor. The infrared detection module includes an infrared sensor configured to monitor the output of the remote control device, and a shield which is at least substantially impervious to infrared radiation, and which at least partially shields the infrared sensor from infrared radiation which does not emanate from the remote control device. The processor is coupled to the infrared detection module, and supplies power to the electrical device at least substantially only when the electrical device is in active use by a nearby user, and based at least in part upon input from the infrared sensor.

9 Claims, 7 Drawing Sheets

SHIELDING OF AN IR DETECTOR

FIELD OF THE INVENTION

The invention relates generally to shielding of an infrared detector from unwanted or rogue infrared signals, and more particularly to an infrared shielding device and method for use on a power saving or power monitoring device to reduce or eliminate the unintended triggering or activation of an IR detector by unwanted infrared signals.

BACKGROUND OF THE INVENTION

Infrared (IR) light refers to light with wavelength longer than that of visible light, and as such is not visible to the human eye. IR light is often used in devices such as television and audio visual equipment which have remote controls to pass signals from the remote control unit to a receiver in order to control the device, for example turning on a television from standby power or changing channels, adjusting volume and so forth.

These remote control units emit a modulated IR signal. This enables a range of codes to be generated by the remote control unit, typically a different code for each button or control on the remote control unit. Further, different manufacturers of infrared remote controls use different codes and different protocols to transmit the commands to remotely controlled devices.

Audio-visual equipment is typically not put into a completely off state where no power is drawn by use of a remote control. This is in order to maintain a state of readiness so that operating power is provided when the appropriate button is selected on the appropriate remote control. This means that the equipment continues to use power at all times, even when apparently not operational. This continual consumption of power can be both costly and a waste of resources.

In order to reduce the consumption of standby power it has been suggested that the device be switched off at the main electrical inlet. However, this is inconvenient as it requires ready access to the wall mounted plug of the audio-visual device in order to switch on and switch off. In many installations users do not have ready access to the wall mounted plug. Even where access is reasonably convenient, users may not be motivated to make the effort to switch the wall socket off after each use. Overall there is a low level of compliance by users.

SUMMARY OF THE INVENTION

An exemplary version of the invention involves a power saving device for reducing power consumption of an external electrical device, including an input connectable to an external power supply; an output connectable to the external electrical device for selectively providing operating power thereto; a processor for controlling that power is supplied to the external electrical device via the output substantially only when the electrical device is in active use by a user present in the vicinity of the electrical device; and an infrared detection module including an infrared sensor for monitoring the output of a remote control device, the remote control device being adapted to be used by a user to control the external electrical device, the module being coupled to the processor, the processor determining whether to supply power to the external electrical device based at least in part upon input from the sensor; wherein there is provided a shield constructed of a material substantially impervious to infrared radiation adapted to shield the infrared sensor at least in part from infrared radiation which does not emanate from the remote control device.

In preference the shield at least partially surrounds the infrared sensor, the shield including at least one opening adapted to allow infrared radiation from the remote control device to pass through the shield to be detected by the infrared sensor.

In preference the opening in the shield is positioned such that when the infrared detection module is positioned adjacent to an infrared remote control sensor of the electrical device, a field of view of the infrared sensor through the opening covers substantially all locations from which a user could successfully operate a remote control device to control the electrical device.

In preference the field of view ensures that the infrared sensor is shielded to a substantial degree from infrared sources other than the remote control device. These sources may be described as rogue IR sources.

Generally, an infrared sensor is an infrared diode.

Materials which are impervious to visible light may still be transparent to infrared radiation. The shield is preferably of material which is opaque to infrared such as aluminium.

In preference the infrared detection module includes an infrared lens which may form a part of a body of the infrared detection module.

The invention also involves an infrared detection module for a power saving device for reducing power consumption of an external electrical device, the power saving device including a processor for controlling that power is supplied to the external electrical device substantially only when the electrical device is in active use by a user present in the vicinity of the electrical device, the module including an infrared sensor for monitoring the output of a remote control device, the remote control device being adapted to be used by a user to control the external electrical device, the infrared detection module being coupled to the processor, the processor determining whether to supply power to the external electrical device based at least in part upon input from the module; wherein there is provided a shield constructed of a material substantially impervious to infrared radiation adapted to shield the infrared sensor at least in part from infrared radiation which does not emanate from the remote control device.

According to the present invention there may be provided a shield for an infrared sensor which is being used to detect activity of an infrared remote control device used to control an electrical device, wherein the shield prevents at least some infrared radiation from sources other than the remote control device from reaching the sensor, while allowing substantially all infrared signals from the remote control device which would be effective in controlling the electrical device, to reach the sensor.

In preference, the shield is constructed of a material which is at least substantially impervious to infrared radiation, the shield including a body having an opening positioned such that infrared signals from the remote control device may pass through to the sensor, the body of the shield blocking at least some other infrared radiation which emanates from locations which are not within an expected locus of operation of the remote control device.

BRIEF DESCRIPTION OF THE DRAWINGS

By way of example, a version of the invention is now described with reference to the accompanying drawings, in which.

DETAILED DESCRIPTION OF PREFERRED VERSIONS OF THE INVENTION

Figure 11:
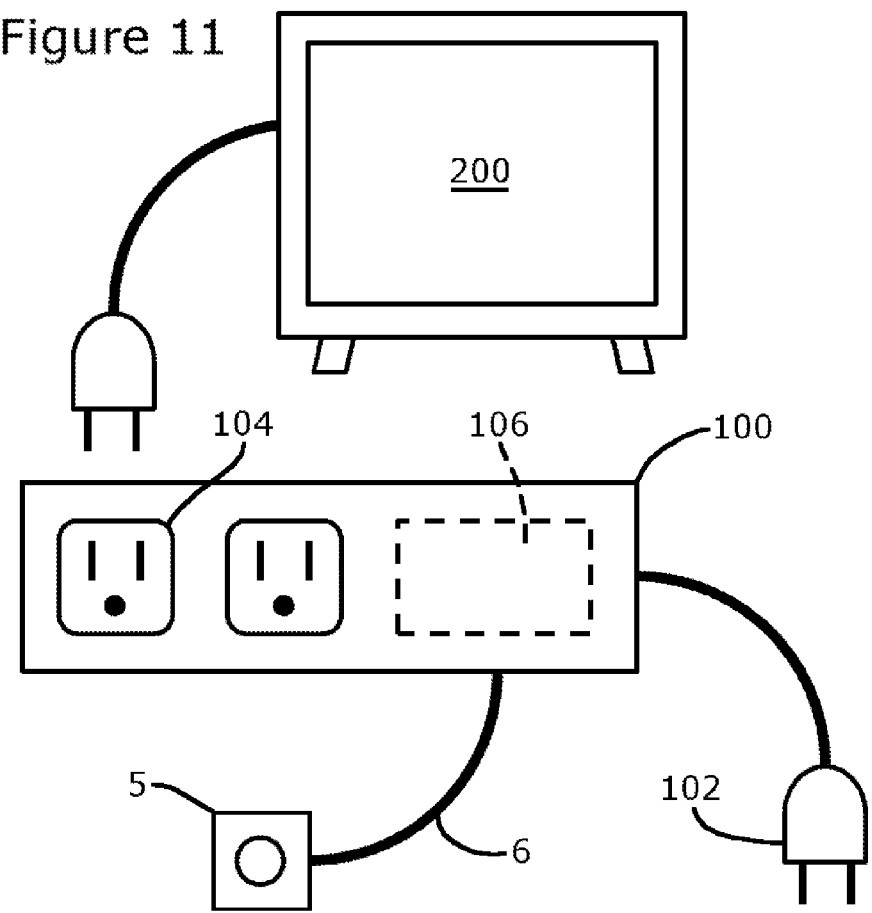
FIG. 11 schematically depicts a version of the power saving device of the present invention.

FIG. 11 illustrates an exemplary power saving device 100 which will remove mains power from one or more electrical devices 200 when the power saving device 100 determines that the electrical devices 200 are not in use. This determination may be done in a variety of ways, and the power saving device 100 may use more than one of these ways. The determination may be done by monitoring the power drawn by the electrical devices 200 or by monitoring the environment for indications of the presence of a user actively using the electrical devices 200. Infrared remote control devices have a short range of action, and require line of sight or near line of sight visibility of the device 200 being controlled in order to work. Therefore, use of a remote control unit to control any function of a device 200 may be taken as a reasonably accurate indication that a user is present in the vicinity of the controlled device 200 and is using the device 200. In these circumstances the user will want power to continue to be supplied to the device 200. The power saving device 100 includes an input 102 connectable to an external power supply; an output 104 connectable to the electrical device 200 for selectively providing operating power thereto; a processor 106 for controlling the power supplied to the electrical device 200 via the output 104 substantially only when the electrical device 200 is in active use by a nearby user via a remote control device 202; and an infrared detection module 5 as described below.

There are a large variety of types of infrared remote controls, using different modulation protocols and different codes to control specific electrical devices. The IR detection by the power saving device is greatly simplified if this variety can be ignored. Accordingly, the power saving device employs an IR detector, in this version an infrared diode, which senses the use of any IR remote control unit. This eliminates the need to "program" devices to respond only to certain buttons on certain remote controls. However, there may exist in the environment, other sources of IR radiation such as overhead lights, IR ports of notebook computers, light entering through windows and others. This IR radiation may be described as rogue IR, since it does not indicate that a user is present and actively using an electrical device.

These rogue IR signals can be detected by the IR detector and processed as though it were a valid IR signal from an infrared remote control, incorrectly being interpreted as indicating the presence of a user actively using an electrical device. This is undesirable.

Figure 1:
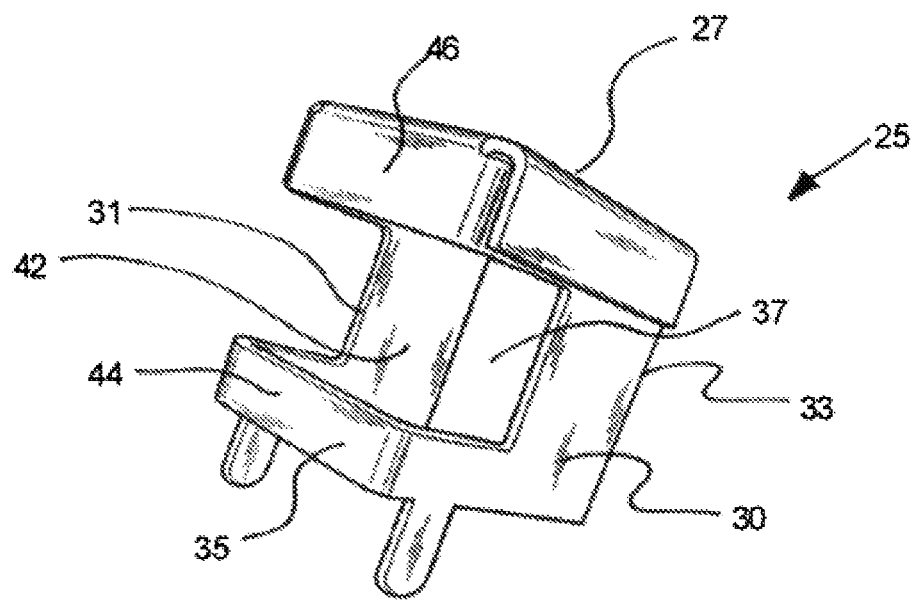
FIG. 1 shows a version of a shield of the present invention in a perspective view.
Figure 2:
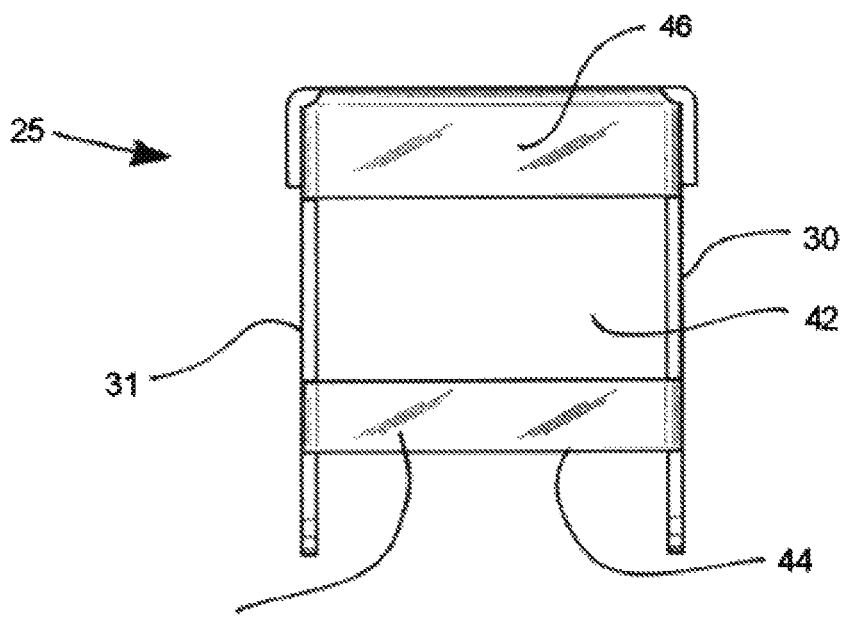
FIG. 2 shows a front view of the device of FIG. 1.
Figure 3:
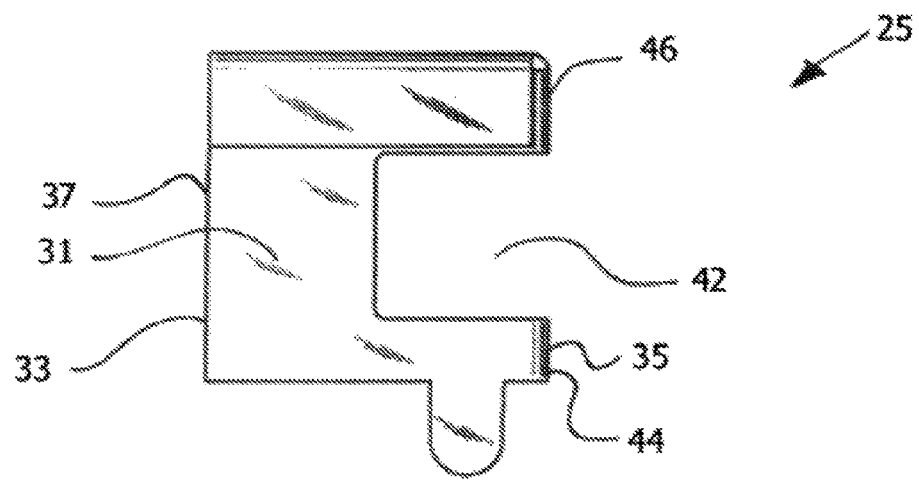
FIG. 3 shows a right hand side view of the device of FIG. 1.
Figure 4:
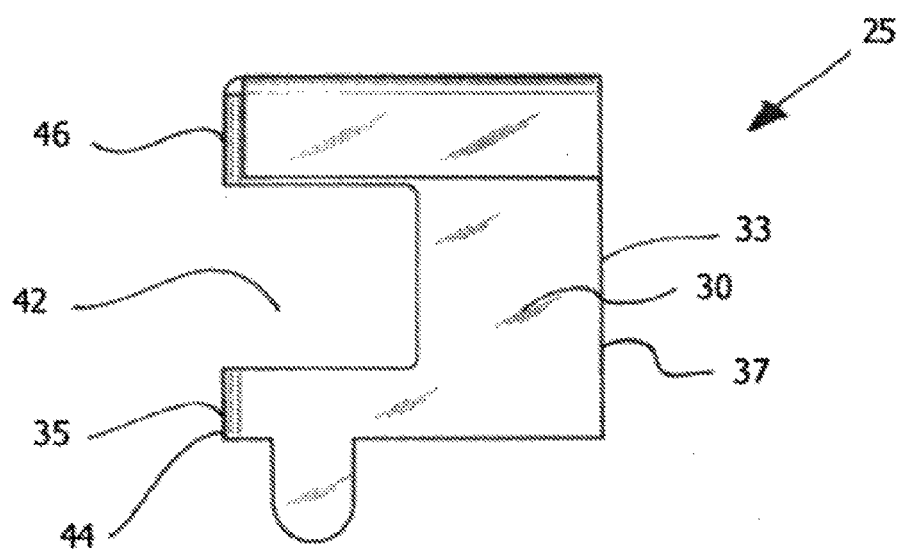
FIG. 4 shows a left hand side view of the device of FIG. 1.
Figure 5:
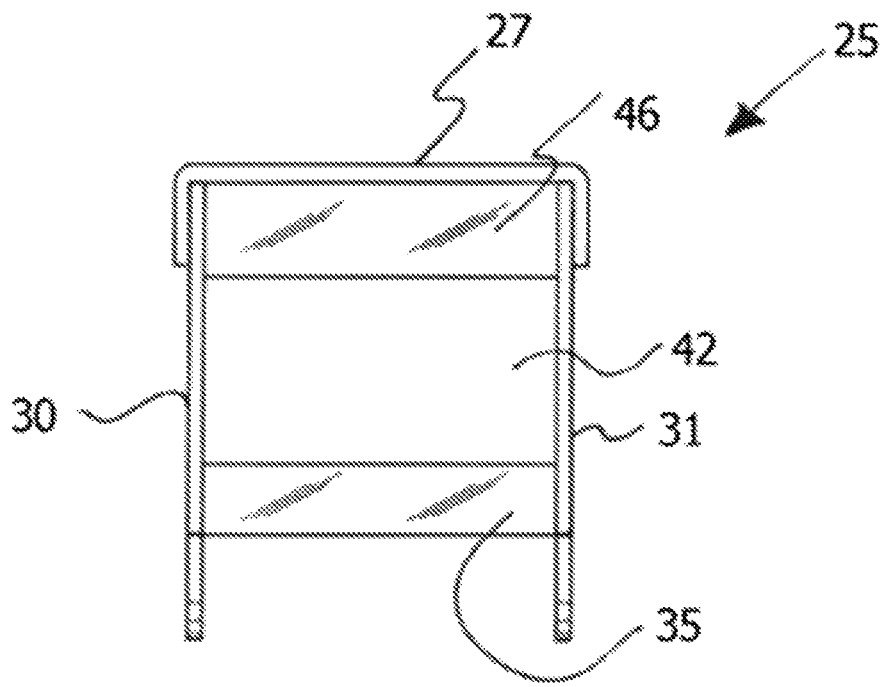
FIG. 5 shows a view of the rear face of the device of FIG. 1.
Figure 6:
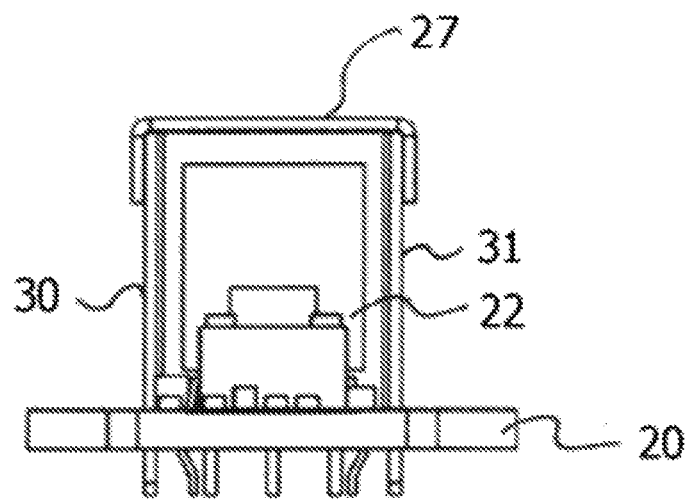
FIG. 6 shows a rear view of a shield of the invention on the circuit board housing an infrared detector.
Figure 7:
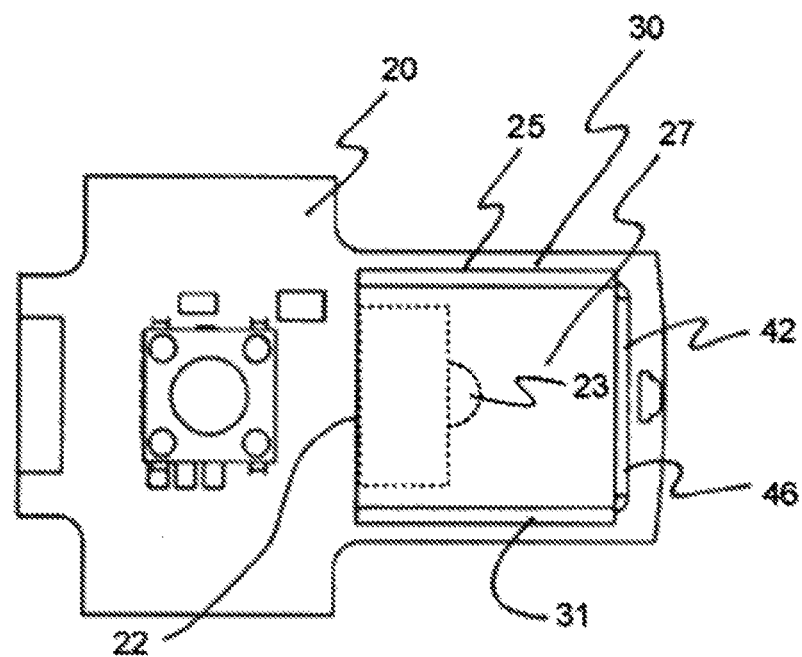
FIG. 7 shows a top view of the device of FIG. 6.
Figure 8:
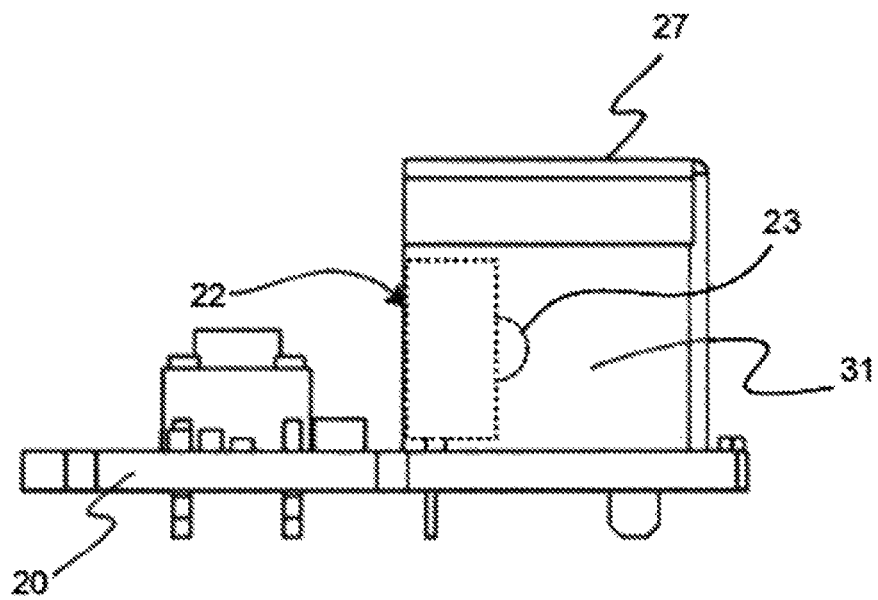
FIG. 8 shows a side view of the device of FIG. 6.
Figure 9:
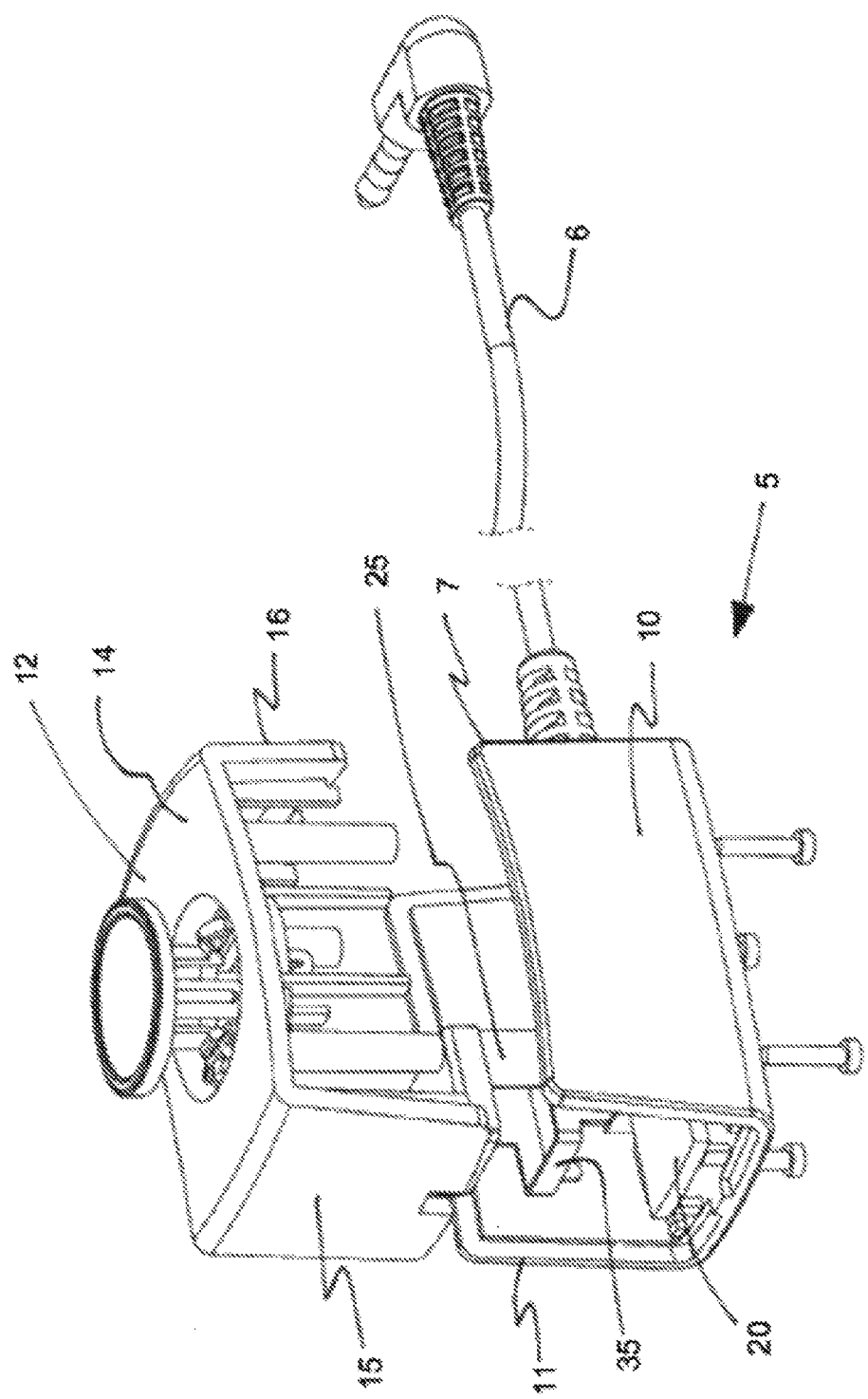
FIG. 9 shows an exploded view of an IR detection module embodying the present invention.

The power saving device includes an IR detection module. In a preferred version, this module is separate from the main body of the power saving device, and is in wired or wireless communication with the power saving device. This allows for freedom in the placement of the power saving device and of the IR detection module for ease of detection of IR radiation from remote control devices used by a user. In other versions, the IR detection module may be located in the enclosure of the power saving device, or may be attached to the power saving device. Referring to the figures (particularly FIG. 9), the IR detection module 5 includes an enclosure body 7 having first and second side walls 10 and 11 respectively and an infrared lens 12 being constructed from a material that allows infrared waves to pass through. The lens 12 may focus, diffuse or reduce the intensity of the IR radiation, or may allow it to pass unimpeded.

In the illustrated version, the IR detection module 5 is in communication with the power saving device via cable 6, although other wired or wireless communication channels may be employed.

The infrared lens 12 has a top surface 14 and a first and second face 15 and 16 respectively. In this particular form of the invention, the infrared lens 12 forms a substantial portion of the overall enclosure, however it is within the scope of the invention that the infrared lens 12 may be significantly smaller, for example only the first face 15 may be present, in which case the enclosure body 7 would also have an upper and rear face (not shown).

In further versions, the shield may form the body portion of the IR detection module. In this case, the infrared lens 12 may fill the opening in the shield.

Within the enclosure body 7 resides an infrared sensor printed circuit board (PCB) 20 having infrared sensing diode assembly 22 including an IR sensing diode 23 attached thereon.

There is provided a shield 25 which substantially covers the IR sensing diode assembly 22 and clips into the PCB 20 through a number of slots on the PCB 20. The shield 25 has a top face 27, a right hand side face 30, and left hand side face 31, each being substantially parallel with one another, a back face 33 and a front face 35. The shield 25 is made of a material which is substantially impervious to IR radiation. In a preferred version the material is aluminium. An opening 37 is provided in the face 33 to allow the IR sensing diode assembly 22 to pass through during manufacture. As can be appreciated, the opening 37 can be of any shape to accommodate an appropriately shaped IR sensing assembly.

The front face 35 includes lower and upper front face portions 44 and 46. The lower and upper front face portions and the side faces 30 and 32 define an opening 42. This opening 42 allows IR signals from a limited range of angles to pass through to be detected by the IR sensing diode 23. By altering the size and shape of the lower and upper front face portions and the side faces 30 and 32, the range of angles from which IR radiation may approach the opening 42 and be visible to the IR sensing diode 23 may be adjusted. In other versions, the opening may be in only one face, which may be any of the front, either side, or rear faces. In other versions the opening may extend over multiple faces, such extension need not be symmetrical. In further versions, multiple openings in the shield may be provided, rather than a single contiguous opening. These alternative openings are provided to shield certain rogue IR sources, whilst allowing IR radiation indicating the presence of a user using a remote control to be received by the IR sensing assembly.

In use, the IR detection module is preferably mounted at a site close to the IR receiver of an electrical device to which the power saving device is controlling the power supply. In this position, the range of angles from which IR radiation from a remote control unit will be received is generally limited. The remote control device will tend to be used in an expected locus of operation which is in front of the controlled device, at a distance of from about one to five meters, and at a height from floor level of a maximum of a height corresponding to waist level of a standing person. Radiation which comes from a point which is substantially outside this range is much more likely to be rogue IR.

Figure 10:
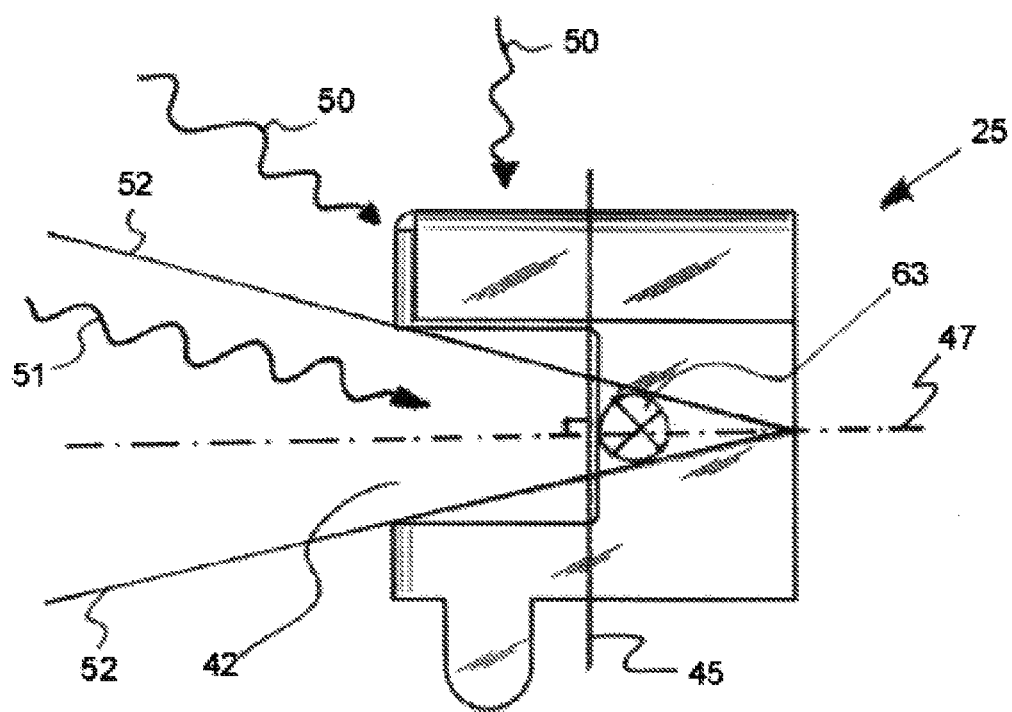
FIG. 10 shows a representation of the mode of action of a shield of the present invention.

Referring to FIG. 10, there is shown a side view of a shield of the invention, with a marker 63 indicating the position which the IR sensing diode 23 will occupy in relation to the shield when the shield is installed in an IR detection module 5, surrounding an IR sensing diode assembly 22. The IR sensing module 22 is installed to have the IR sensing diode aligned with a line 45 perpendicular to a centreline 47 of the shield opening 42. The forward field of view of the installed IR sensing diode through the opening 42, is illustrated by the sightlines 52. Thus it may be seen that, in use, rogue IR 50 from sources such as overhead lights strike the shield and is not detected by the IR detection diode 22. IR radiation 51 from remote control units used by a user to control an electrical device, emanate from within the sightlines 52, and pass through the opening 42 to be received by the IR sensing diode.

Rogue IR signals reaching the IR sensing diode 22 are thus significantly reduced. This provides improved performance of the power saving device in reacting only to IR signals from usage of electrical device controlling remote control devices and thus improved discrimination of the continuing presence of a user actively using the electrical device.

Although a preferred version of the invention has been described herein in detail, it would be apparent to the person skilled in the art that there is modifications to the details of construction and assembly as shown and described may be made without departing from the scope of this invention.

The invention claimed is:

1. A power saving device for reducing power consumption of an external electrical device controlled by infrared radiation from a remote control device, the power saving device including:
    (a) an input connectable to an external power supply;
    (b) an output connectable to the external electrical device for selectively providing operating power thereto;
    (c) an infrared detection module including:
        (1) an infrared sensor configured to monitor the output of the remote control device,
        (2) a shield constructed of a material impervious to infrared radiation, the shield being configured to at least partially shield the infrared sensor from infrared radiation which does not emanate from the remote control device;
    (d) a processor:
        (3) configured to control the power supplied to the external electrical device via the output when the external electrical device is in active use by a user present in the vicinity of the external electrical device,
        (4) coupled to the infrared detection module, wherein the processor is configured to supply power to the external electrical device based at least in part upon input from the infrared sensor.

2. The power saving device of claim 1 wherein the shield:
    (a) at least partially surrounds the infrared sensor, and
    (b) includes at least one opening adapted to allow infrared radiation from the remote control device to pass through the shield to be detected by the infrared sensor.

3. The power saving device of claim 1 wherein the opening in the shield is positioned such that when the infrared detection module is positioned adjacent to an infrared remote control sensor included in the electrical device, a field of view of the infrared remote control sensor through the opening covers substantially all locations from which a user could successfully operate a remote control device to control the electrical device.

4. The power saving device of claim 3 wherein the field of view ensures that the infrared sensor is shielded from infrared sources which are not the remote control device.

5. The power saving device of claim 1 wherein the infrared sensor is an infrared diode.

6. The power saving device of claim 1 wherein the shield is at least partially constructed from aluminum.

7. The power saving device of claim 1 wherein the infrared detection module includes an infrared lens.

8. The power saving device of claim 7 wherein:
    (a) the infrared detection module is bounded by a body, and
    (b) the infrared lens defines a part of a body of the infrared detection module.

9. An infrared detection module for a power saving device for reducing power consumption of an external electrical device controlled by infrared radiation from a remote control device adapted to be used by a user to control the external electrical device, the power saving device including a processor configured to supply power to the external electrical device when the remote control device of the electrical device is in active use by a user present in the vicinity of the electrical device, the infrared detection module including:
    (a) an infrared sensor configured to monitor the output of the remote control device,
    (b) a shield constructed of a material impervious to infrared radiation, the shield being configured to at least partially shield the infrared sensor from infrared radiation which does not emanate from the remote control device.

* * * * *